United States Patent
Walz et al.

(10) Patent No.: US 11,015,643 B2
(45) Date of Patent: May 25, 2021

(54) ROLL DEVICE

(71) Applicant: MWN IN NIEFERN MASCHINENFABRIK GMBH, Niefern-Öschelbronn (DE)

(72) Inventors: Andreas Walz, Neulingen (DE); Wolfgang Lindörfer, Karlsruhe (DE)

(73) Assignee: MWN in Nietern Maschinenfabrik GmbH, Niefern-Öschelbronn (DE)

( * ) Notice: Subject to any disclaimer, the term of this patent is extended or adjusted under 35 U.S.C. 154(b) by 230 days.

(21) Appl. No.: 16/211,779

(22) Filed: Dec. 6, 2018

(65) Prior Publication Data

US 2019/0107145 A1  Apr. 11, 2019

Related U.S. Application Data

(63) Continuation of application No. PCT/EP2017/061402, filed on May 11, 2017.

(30) Foreign Application Priority Data

Jun. 14, 2016 (DE) .......................... 102016210565.5

(51) Int. Cl.
| | |
|---|---|
| *F16C 13/00* | (2006.01) |
| *B65H 23/025* | (2006.01) |
| *F16C 3/02* | (2006.01) |
| *F16C 23/08* | (2006.01) |
| *F16C 19/54* | (2006.01) |
| *F16C 19/46* | (2006.01) |

(52) U.S. Cl.
CPC ....... *F16C 13/003* (2013.01); *B65H 23/0255* (2013.01); *F16C 3/026* (2013.01);
(Continued)

(58) Field of Classification Search
CPC ...... F16C 13/003; F16C 19/546; F16C 19/46; F16C 3/026; F16C 23/084; F16C 2324/16;
(Continued)

(56) References Cited

U.S. PATENT DOCUMENTS

| | | | |
|---|---|---|---|
| 2,689,392 A * | 9/1954 | Robertson .............. | D06C 3/067 26/104 |
| 3,344,493 A | 10/1967 | Telgheider | |

(Continued)

FOREIGN PATENT DOCUMENTS

| | | |
|---|---|---|
| DE | 2519954 A1 | 11/1975 |
| DE | 29613795 U1 | 1/1997 |

(Continued)

*Primary Examiner* — Sarang Afzali
(74) *Attorney, Agent, or Firm* — Duane Morris LLP

(57) ABSTRACT

A roll device as a spreader roll has a rotating hollow roll tube which at the ends thereof is rotatably mounted by means of bearing ends which are mounted in rotary bearings. The roll device has a tension element which runs so as to be eccentric to the central longitudinal axis of the roll tube through the roll tube and by internal tension toward the ends of the roll tube is impinged by a force with pressure. As a result, the roll tube is capable of being bent by way of an impingement of the tension element with a force, the deflection being transversely away from the longitudinal extent of said roll tube, if the tension element is tensioned in relation to the roll tube in an axial direction.

25 Claims, 2 Drawing Sheets

(52) U.S. Cl.
CPC ............ *F16C 19/46* (2013.01); *F16C 19/546* (2013.01); *F16C 23/084* (2013.01); *B65H 2404/117* (2013.01); *B65H 2404/172* (2013.01); *B65H 2404/185* (2013.01); *F16C 2324/16* (2013.01)

(58) Field of Classification Search
CPC .......... B65H 23/0255; B65H 2404/117; B65H 2404/172; B65H 2404/185
See application file for complete search history.

(56) References Cited

U.S. PATENT DOCUMENTS

| | | | | |
|---|---|---|---|---|
| 3,729,788 | A | * | 5/1973 | Tawa ...................... B29C 43/22 26/104 |
| 3,838,480 | A | | 10/1974 | Depuy |
| 3,940,043 | A | | 2/1976 | Staples |
| 4,856,158 | A | * | 8/1989 | Lindroos ................... D21F 1/40 492/20 |
| 5,885,201 | A | * | 3/1999 | Brown ................. D21G 1/0006 492/20 |
| 6,732,640 | B1 | * | 5/2004 | Newman ................. B05C 17/08 101/127.1 |
| 7,824,320 | B2 | | 11/2010 | Kerschbaumer et al. |

FOREIGN PATENT DOCUMENTS

| | | | |
|---|---|---|---|
| EP | 1929164 | B1 | 3/2013 |
| FR | 2190205 | A5 | 1/1974 |

* cited by examiner

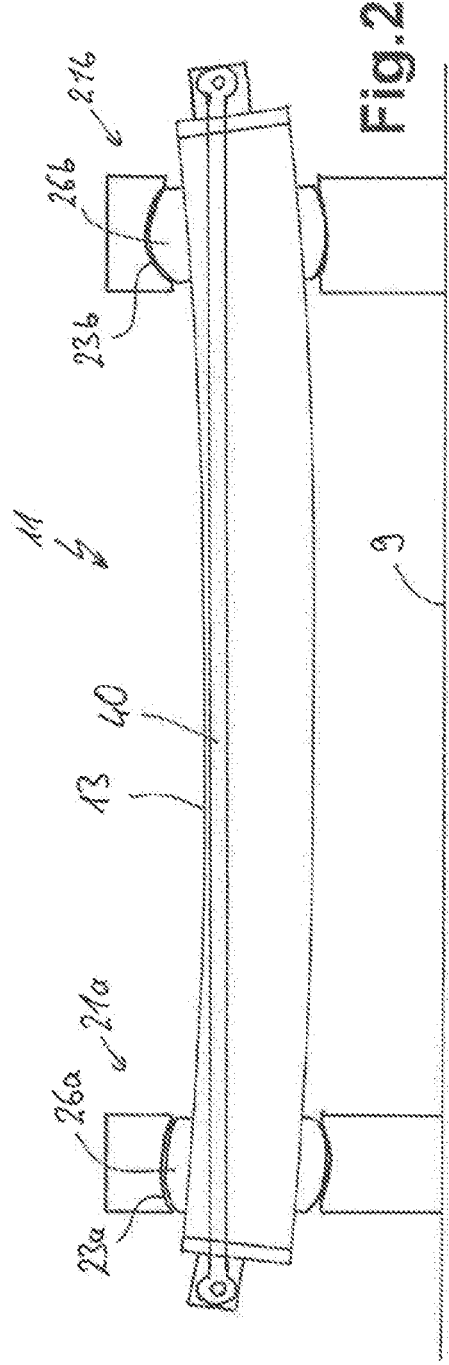
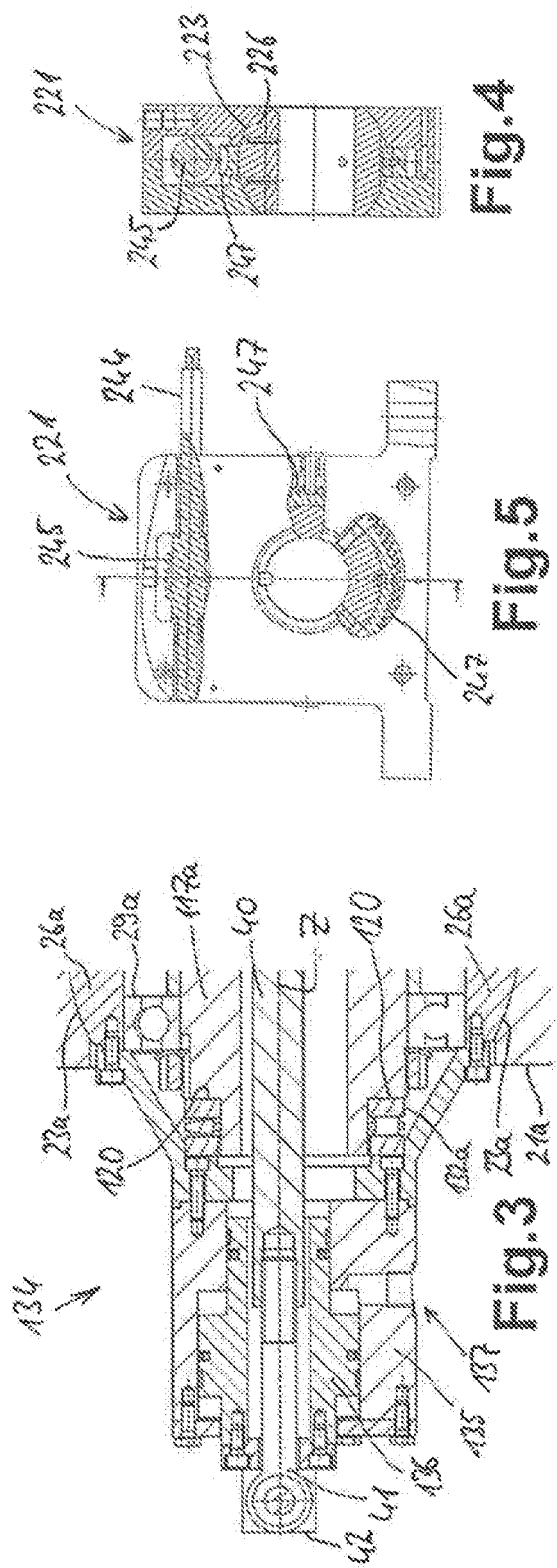

ROLL DEVICE

CROSS-REFERENCE TO RELATED APPLICATIONS

This application is a continuation of International Patent Application PCT/EP2017/061402, filed May 11, 2017, which claims priority to German Patent Application No. 102016210565.5, filed Jun. 14, 2016, the entireties of which are herein incorporated by reference.

FIELD OF APPLICATION AND PRIOR ART

The invention relates to a roll device having a hollow rotating roll tube, which device is used in particular as a so-called spreader roll in a paper machine.

Roll devices having a rotating roll tube and in which sagging in a central region is ideally to be avoided are known, for example, from DE 29613795 U1. This serves in particular for a nip, or a bearing in relation to a counter roll, to remain consistent.

Spreader rolls which are not intended to run in a straight line but to have a sag, in particular a sag toward a flat material web that is transported by said spreader rolls, are furthermore known. On account thereof, the material web is drawn outward, or toward the sides, respectively, and is thus smoothed. A multiplicity of round roll tube segments herein can be rotatably mounted on a roll core which has the desired bow shape. However, the use of a multiplicity of roll tube segments having in each case a complex mounting of each individual roll tube segment is considered to be very disadvantageous.

A further spreader roll in which sagging toward a flat material web that is transported by said spreader roll is intended to be achieved is known from U.S. Pat. No. 7,824,320 B2.

OBJECT AND ACHIEVEMENT

The invention is based on the object of achieving a roll device mentioned at the outset by way of which the problems of the prior art can be avoided and by way of which it is in particular possible to design a roll, or a roll tube, respectively, which rotates and optionally also rotates rapidly so as to be bent or to bend along a predefined bending line.

This object is achieved by a roll device having the features of claim 1. Advantageous and preferred design embodiments of the invention are the subject matter of the further claims and will be explained in more detail hereunder. The wording of the claims is incorporated in the content of the description by way of explicit reference.

It is provided that the roll device has a rotating hollow roll tube, wherein said roll device is in particular configured for use as a spreader roll in a paper machine. Said roll tube at the ends thereof is rotatably mounted by means of bearing ends which are mounted in rotary bearings, wherein the shaft tube can preferably be push-fitted onto the bearing ends, optionally by means of a tubular adapter element. No support that engages or bears on the roll tube is preferably provided within the roll tube, or between the bearing ends, respectively.

According to the invention, the roll device has a tension/compression element which hereunder is referred to as TC element and which runs through the roll tube and toward the ends of the roll tube is impinged by a force. The TC element can thus be connected to the ends of the roll tube or press against said ends, above all when the TC element per se is configured as a tension element and is under tension. On account of the impingement of the TC element with a force, in particular with tension, so as to press from the outside against the ends of the roll tube, the roll tube bends by way of a deflection that is transversely away from the longitudinal extent of said roll tube. The roll tube can thus be bent by the TC element in a manner similar to that of a bow being bent by a string. The curvature and thus the deflection of the roll tube can be influenced, or adjusted, respectively, by modifying the impingement of the roll tube with a force by the TC element, or by decreasing or increasing the length of the TC element in a corresponding manner, respectively.

The advantage of the invention thus lies in that the bending or the deflecting of the roll tube is achieved by exerting tension or advantageously pressure on the roll tube. Exerting tension on the roll tube here means that the TC element as a pure tension element is contracted, or shortened, respectively, and pulls at the ends of the roll tube. Said ends herein are pressed in the direction toward one another. In the case of a roll tube with sufficient inherent stability no intervening support of the roll tube, which could otherwise potentially serve for ensuring the bending or the deflecting, respectively, is required.

In a design embodiment of the invention one or two rotary bearings can be provided at each bearing end. In the case of two rotary bearings, the mutual spacing thereof can be between 10% and 200%, advantageously between 20% and 100%, of the diameter of the roll tube. A positive rotary bearing of the roll tube is achieved on account thereof.

In a further design embodiment of the invention bearing blocks can be provided at the end regions of the roll device, the aforementioned rotary bearings being mounted or fastened, respectively, in said bearing blocks, preferably in a rotary bearing receptacle. The rotary bearings herein are advantageously mounted so as to be pivotable in the bearing blocks, or in the rotary bearing receptacle, respectively, wherein a pivot axis can run perpendicularly to the central longitudinal axis of the roll tube, or of the TC element, respectively, or run from one bearing block to another bearing block. It is thus possible for the roll tube, or the bearing ends, respectively, to be mounted in the rotary bearings. The rotary bearings can conjointly pivot in the event of the roll tube bending or deflecting, respectively, and thus also in the case of bearing ends that are being moved out of a straight extent. On account thereof it is inter alia possible for a torque-free bearing to be achieved, as will be explained in yet more detail hereunder.

A rotary bearing receptacle of the rotary bearings is advantageously disposed in an aforementioned bearing block so as to be rotatable about an axis which runs so as to be approximately parallel with the roll tube. A bow plane of the bent roll tube can thus be rotated out of position. The bending or the deflection, respectively, of the roll tube is thus indeed not modified, but it is set by a rotation out of position, relative to a passage plane of the flat materials, how heavily the roll tube is pressed or bent, respectively, into said plane. If the crown line of the bending is rotated directly in relation to the plane, thus when a bow plane is perpendicular to a passage plane, a maximum deflection is present. If the crown line conjointly with the roll tube is rotated by 90°, the bow plane is approximately parallel with the plane of the material web, and the bending of the roll tube, or of the roll device, respectively, does not have any effect on the material web at all.

In a further design embodiment of the invention a gearbox, in particular a worm gear, can be provided on the bearing block so as to rotate the aforementioned rotary bearing receptacle out of position. Such a gearbox is particularly advantageously provided on each bearing block, wherein a uniform rotation of the rotary bearing receptacle, and thus also of the bow plane of the bent roll tube, out of position can be caused on account of a mechanical coupling of the gearboxes, or an electrical coupling of drives for the gearboxes.

An aforementioned torque-free bearing of the roll tube and/or of the bearing ends in the rotary bearings preferably does not have any torque about an axis which runs perpendicular to the longitudinal extent of the roll device. This means that the bending of the roll tube is not caused in that the bearing ends, or the ends of the roll tube per se, are bent on account of a torque being applied, thus in that the rotary bearings are fixedly and immovably disposed in the bearing blocks, for example, such that the roll tube is inherently bent or deflected, respectively, by a corresponding rotation of the bearing blocks out of position. In mechanical terms, the latter would be implementable by way of significantly more complexity than a roll tube according to the invention, which on account of the TC element is inherently tensioned and thus bent and deflected, without bearing forces or torques being applied.

In an advantageous design embodiment of the invention axial bearings that are capable of being impinged with pressure are provided at the bearing ends, in particular close to the free ends of said bearing ends, preferably still outside the rotary bearings. The bearing ends preferably support the roll tube such that the roll tube can be connected only to the bearing ends and not directly to rotary bearings or axial bearings. An adapter element, or adapter tube, respectively, can also be provided therebetween. A roll tube can thus be constructed differently from the very stable bearing ends which are advantageously composed of metal, in particular be constructed so as to be much thinner than said bearing ends. The mentioned axial bearings can be disposed on or bear on, or be push-fitted by way of cuts and/or diameter tapers at end regions of the bearing ends. The TC element in this instance presses against the axial bearings, or is impinged with a force in relation to said axial bearings, respectively. A relative rotatability between the roll tube and the TC element is thus provided. The tensile force that is exerted by the TC element, when transmitted from the bearing ends to the roll tube, then specifically causes the mentioned bending or deflecting, respectively, of the roll tube. The bearing ends herein are advantageously configured such that said bearing ends are not deformed, with only the roll tube being deformed or bent, respectively.

A roll tube can advantageously be push-fitted in an exact fit onto the bearing ends, or onto support portions of the bearing ends that point toward one another. Additionally or alternatively, said roll tube by way of end sides, or end faces or end edges, respectively, can bear on encircling detent shoulders of the bearing ends such that an introduction of compressive forces, as the impingement with a force caused by the TC element, into the roll tube is possible in a positive and uniform manner. The bearing ends are particularly advantageously connected to the roll tube in a rotationally fixed manner. This can be performed by way of adhesive bonding or the like, on the one hand, or alternatively by way of connection pins. Said connection pins can run in the longitudinal direction of the roll tube and be bored into the end sides or end faces, respectively, of the roll tube. Alternatively, the connection pins can run in the radial direction but in this instance should ideally not project beyond the external side of the roll tube. In order for a roll tube per se to be able to be configured as thin as possible in order for said roll tube to be readily bent in each revolution, an aforementioned adapter element can be provided at the ends of the roll tube, said adapter element being push-fitted into said ends and advantageously being adhesively bonded in order to be fastened. Said adapter element can be composed of metal or of the material of the roll tube per se. Said adapter element reinforces those ends at which the force as a compressive force for bending the roll tube is introduced. An aforementioned rotationally fixed connection between the adapter elements and the bearing ends is provided in this case.

In an advantageous design embodiment of the invention the TC element is disposed so as to be eccentric to a central longitudinal axis of the roll tube. An offset can be between 1% and 40%, preferably between 5% and 20%, of the diameter of the roll tube. On account thereof, the roll tube is automatically bent or deflected, respectively, so to speak by the tensile loading of the TC element, specifically in the direction away from that side to which the TC element is disposed to be closer. The larger the offset, the larger the gearing ratio between the tensile force which is applied and acts on the TC element and the force that causes the bending or deflecting, respectively, of the roll tube.

Alternatively, it is indeed also possible for the TC element to be allowed to run along the central longitudinal axis of the roll tube and, after applying a heavy tension on the TC element, since any bending or deflecting, respectively, of the roll tube will not result on its own, to externally apply said bending or deflecting, respectively, by heavily deflecting the roll tube by way of an external force, for example. This can be performed, for example, by pushing or pulling at a central region of the roll tube. However, in this instance minor bending or deflecting, respectively, of the roll tube is hardly possible, on the one hand, and the complexity for the external application of a force is considered an interference, on the other hand.

In an advantageous design embodiment of the invention the TC element runs parallel with a central longitudinal axis of the roll tube. A symmetrical force for bending or deflecting, respectively, the roll tube can thus be applied. Alternatively, it is indeed also possible for the TC element to not run parallel with the central longitudinal axis. However, this renders the procedure of bending or deflecting, respectively, the roll tube more difficult to handle and could compromise precision.

The TC element preferably runs above the central longitudinal axis of the roll tube, such that the latter bends or deflects, respectively, in a downward manner. This is however not mandatory. After all, as has been explained above, a rotary bearing, or a rotary bearing receptacle on the bearing blocks, can in particular also be rotated.

In a preferred design embodiment of the invention the TC element as a tension element is exclusively stressed for tension. An active impingement with a force can advantageously be provided only at one end of the TC element, for example by way of a hydraulic device. A manually activatable hydraulic device having a hand pump is advantageously provided here, said hydraulic device being able to generate sufficient forces. The TC element on the other side can be axially supported in relation to the roll tube, or in relation to the bearing end, respectively. Ultimately, it is only a matter of shortening the TC element, or of applying a force by way of the TC element, respectively; how said force and at which locations said force is applied, respectively, is not relevant. A corresponding shortening of the TC element on connection devices between the TC element and a support in relation to one of the bearing ends is also considered as a shortening of the TC element. The advantage of using the TC element as a pure tension element lies in that the large major forces which in this instance cause the bending or deflecting, respectively, of the roll tube remain within the roll, so to speak, and do not have to be externally absorbed by the bearing blocks or other bearings. Only the mentioned axial bearings have to be very stable when the TC element is supported in relation to the roll tube, or in relation to the bearing ends, respectively, by means of axial bearings. Using such axial bearings it is then possible for the TC element to be disposed so as to be static, thus not to rotate, on the roll device. The roll tube together with bearing ends rotates relative to the TC element, wherein it is to be noted that the roll tube in each complete revolution, because of the rotation out of position in relation to the static TC element and the consistent bending plane, twists or sags once, respectively. No consistent bending or deflecting, respectively, of the roll tube therefore takes place. Much attention has therefore to be paid to the choice of material and the processing of the roll tube. Yet more to this end will be discussed hereunder. The advantage herein lies in that the rotating mass is lower specifically because the TC element does not have to be conjointly rotated. Moreover, the basic design of said TC element would be difficult in view of a probable eccentric disposal of the TC element.

Alternatively, the TC element can indeed also rotate on the roll device, to which end said TC element can, for example, be fixedly connected or tensioned in relation to the roll tube, or the bearing ends, respectively. Complex axial bearings between the TC element and the bearing ends can be dispensed with in this instance. On the other hand, the positioning of the TC element in this instance is however very important in terms of the question of the rotary forces or vibrations that are created when the roll device is intended to rotate rapidly.

In an advantageous design embodiment of the invention a drive for the roll device is provided laterally on an end region of the roll tube and/or on the bearing end. A belt pulley on a bearing end close to a rotary bearing receptacle, or of one of the aforementioned bearing blocks, respectively, is advantageously provided herein. A belt pulley is advantageously provided within the bearing blocks such that the latter do not require any space toward the outside. A drive by way of a belt pulley is known and successful in the prior art.

In order for the aforementioned requirements in terms of the highly-stressed roll tube to be met, the latter is advantageously non-metallic, or has a core or an internal part, respectively, from a fiber material or a fiber-composite material, respectively, thus is composed of such material in the interior. The structural or supporting function of the roll tube is thus assumed by the fiber material or the fiber-composite material, respectively. Said roll tube as a tube is advantageously composed substantially of such fiber material or fiber-composite material, and can have a functional surface or coating which is likewise advantageously non-metallic or of a plastics material or rubber, respectively. A wall thickness of such a roll tube of fiber material can be, for example, 4 mm to 10 mm at a length of approximately 4 meters. The aforementioned spreader rolls are specifically not excessively stressed by force and therefore do not have to be able to absorb any very high forces, since said spreader rolls do not bear on counter rolls. On account of the relatively minor wall thicknesses and special fiber materials it can in this instance also be achieved that the roll tubes in the case of the permanent bending mentioned at each rotation do not display any premature material fatigue. Furthermore, the drive force required is not very high, since said drive force not only has to drive the roll but also permanently bend the latter.

A TC element can have connection means at the ends, in particular for connecting to the bearing ends. The TC element can be a tension bar which is made from metal or from fiber material. Since the TC element is advantageously disposed so as to be static on the roll device and does not have to be conjointly rotated, thus also does not have to be accelerated, the weight of said TC element is not a particularly decisive factor. Rather, it is of great importance that said TC element is resistant to elongation.

This feature and further features are derived from the claims and also from the description and the drawings, wherein the individual features can be implemented individually or in a plurality thereof in the form of sub-combinations in the case of an embodiment of the invention as well as in other fields and can constitute advantageous embodiments that per se are capable of protection, for which protection is claimed here. The subdivision of the application into individual sections and sub-headings does not limit the general validity of the statements made in the context of said sections and sub-headings.

BRIEF DESCRIPTION OF THE DRAWINGS

Exemplary embodiments of the invention are schematically illustrated in the drawings and will be explained in more detail hereunder. In the drawings:

FIG. 2 shows a schematic illustration of a sagging roll tube of the roll device from FIG. 1, having a tension element running therein;

FIG. 3 shows an enlargement of the left region of a slightly modified roll device;

FIG. 4 shows a sectional illustration through a bearing block similar to that of FIG. 1, having a rotary adjustment; and FIG. 5 shows a partial section through the bearing block from FIG. 4, having a sectional plane vertical to the drawing plane.

DETAILED DESCRIPTION OF THE EXEMPLARY EMBODIMENTS

Figure 1:
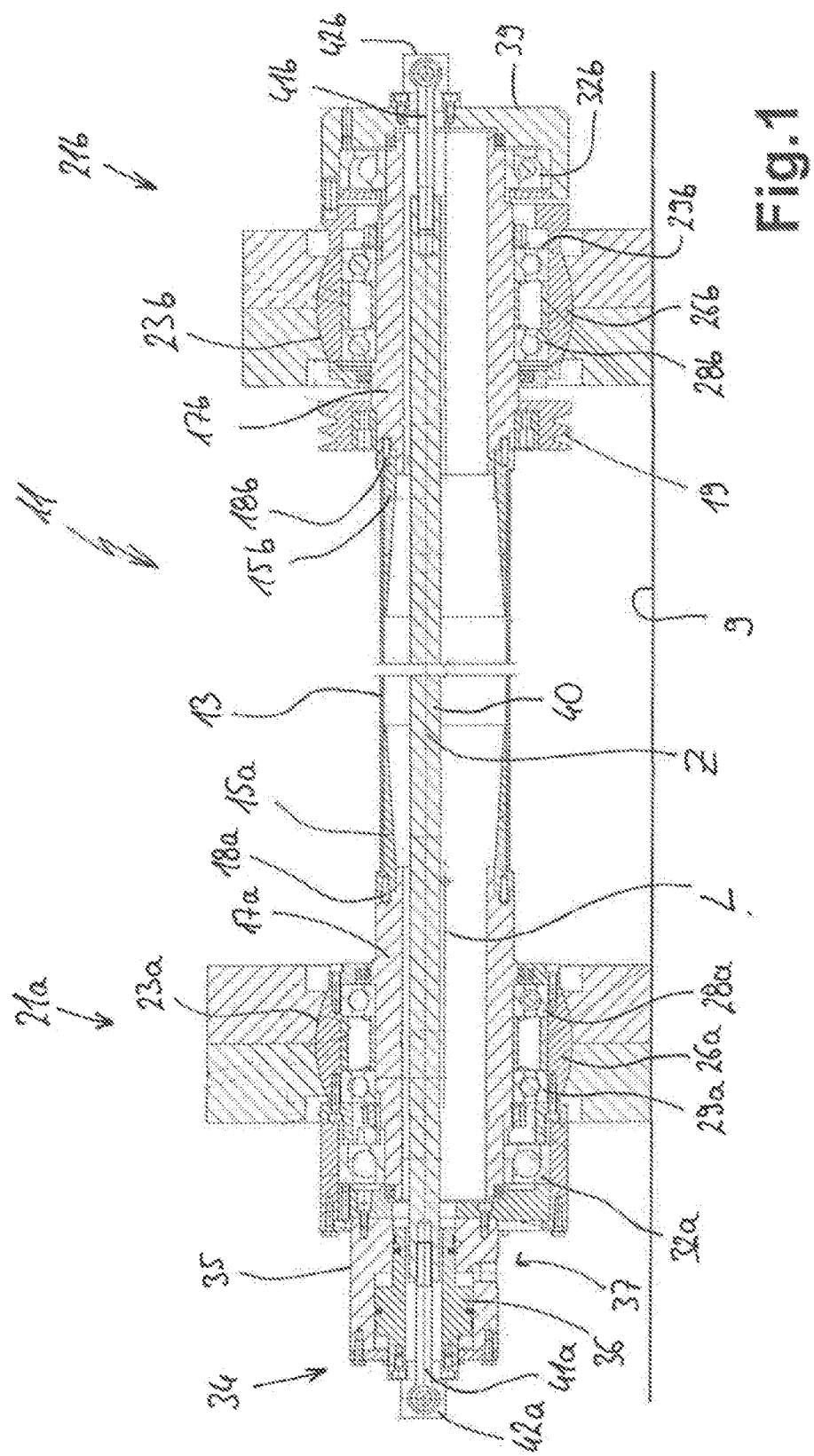
FIG. 1 shows a sectional illustration through an entire roll device according to the invention.

A roll device 11 according to the invention which is set up on a base 9 is shown in FIG. 1. The roll device has a roll tube 13 which is advantageously composed of a fiber-composite material, in particular having carbon fibers in a matrix of resin. The carbon fibers here are in the form of rovings wound to the roll tube 13, having a circumferential tier proportion of 15% and a longitudinal tier proportion of 85%, for example. The wall thickness of the roll tube herein can very generally be between 2 mm and 12 mm; the length is between 4 m and 5 m. A diameter of the roll tube 13 can be between 10 cm and 15 cm. The roll device 11 is configured as a spreader roll mentioned at the outset, or the roll tube 13 is intended to form a spreader roll and to this end run in an arcuate manner. This will be explained hereunder, in particular by means of FIG. 2.

Adapter elements 15*a* and 15*b* are incorporated and advantageously bonded in the free ends of the roll tube 13. Said adapter elements can potentially already be incorporated or wrapped, respectively, in the production of the roll tube 13. The adapter elements 15*a* and 15*b* can also be composed of fiber-composite material, alternatively and advantageously of metal or steel, respectively. Said adapter elements 15a and 15b taper off toward the inside. In the thick external regions the roll tube 13 conjointly with the adapter elements 15a and 15b is plug-fitted onto bearing ends 17a and 17b. Axially running pins 18a and 18b can be provided for a rotationally fixed connection. The adapter elements 15a and 15b are inter alia advantageous for this linking of the rotationally fixed connection.

As can be seen, the bearing ends 17a and 17b are configured so as to be solid and are composed of steel. Said bearing ends 17a and 17b can advantageously be of identical configuration but this is not mandatory, however. A pulley disc 19 is fastened in a rotationally fixed manner to the right bearing end 17b. The roll device 11, or the roll tube 13, respectively, can be rotated by a corresponding belt and a drive motor.

The bearing ends 17a and 17b are in each case mounted in bearing blocks 21a and 21b. To this end, the bearing blocks 21a and 21b, which are configured in two parts, toward the inside have an encircling convex bearing face 23a and 23b. Spherical part-shells 26a and 26b are mounted in said bearing faces 23a and 23b. Two rotary bearings 28a and 28b and 29a and 29b are in each case disposed so as to be mutually spaced apart in the spherical part-shells 26a and 26b. The mutual spacing can be 4 cm to 10 cm, for example. The bearing ends 17a and 17b are rotatably mounted in the rotary bearings 28a and 28b and 29a and 29b.

Axial bearings 32a and 32b are provided so as on both sides to be somewhat remote from the external rotary bearings 29a and 29b. Said axial bearings 32a and 32b are configured for transmitting axial forces to the bearing ends 17a and 17b, and are mounted in a corresponding manner.

A tensioning device 34 is provided in the left region of the roll device 11, said tensioning device 34 having a cylinder 35 which is disposed outside the axial bearing 32a and which has a piston 36 that is movable in said cylinder 35. Hydraulic oil can be supplied by way of a hydraulic connector 37 and can urge the piston 36 to the left in the cylinder 35.

The piston 36 has a longitudinal bore through which a tension element eyelet 41a that is screwed into an elongate tension element 40 runs. Said tension element eyelet 41a at the end is connected to a head 42a which bears on the outwardly pointing end side of the piston 36, so to speak. The tension element 40 can be a steel bar; alternatively, said tension element 40 can also be composed of a fiber-composite material. In any case said tension element 40 should be resistant to elongation. A diameter can generally be between 1 cm and 5 cm.

It can also be seen here that a longitudinal central axis Z of the tension element 40 does not run along a longitudinal central axis L of the roll tube 13 but rather significantly thereabove, thus in an eccentric manner. The spacing can be a few centimeters, for example 2 cm. The tension element Z is thus offset by 2 cm in relation to the longitudinal central axis L of the roll tube 13. The tensioning device 34 is also offset in relation to the longitudinal central axis L in a corresponding manner.

No tensioning device is provided in the right region of the roll device 11, since said tensioning device is not required. Here, a tension element eyelet 41b by means of a head 42b bears externally on a type of cap 39 which presses against the right axial bearing 32b, in the axial direction against the right bearing end 17b.

It can be seen from FIG. 1 that the bearing blocks 21a and 21b fixedly stand on the base 9. The roll tube 13 together with the bearing ends 17a and 17b can rotate in an arbitrary manner about the longitudinal central axis L of said roll tube 13. The tensioning device 34 and the cap 39 as well as the entire tension element 40 do not rotate herein. Rotation out of position within the drawing plane can be performed on account of the concave bearing faces 23a and 23b in the bearing blocks 21a and 21b, and the spherical part-shells 26a and 26b disposed therein as rotary bearing receptacles.

If, proceeding from an exactly straight roll tube 13 in an initial state of the roll device 11, the tensioning device 34 is activated by supplying correspondingly pressurized hydraulic oil at the hydraulic connector 37, the piston 36 is thus urged to the left in the cylinder 35. Said piston 38 herein by means of the head 42a pulls the tension element eyelet 41a to the left, and exerts tension on the tension element 40. On the left, the tensioning device is supported on the left bearing end 17a. On the right, the tension element 40 is supported on the roll device 11 by means of the cap 39 and the axial bearing 32b on the right bearing end 17b. As the tension by the tension element 40 increases, and because the latter is disposed so as to be eccentric in relation to the longitudinal central axis L of the roll tube 13, the roll tube 13 will sag downward in the relative shortening of the tension element 40. As can be seen, this is specifically caused by the tension element 40, by way of the longitudinal central axis Z thereof, running above the central longitudinal axis L of the roll tube 13. This bend, or the resulting bow, respectively, can be set so as to depend on the tensile force that is applied to the tensioning device 34 and on the consequential downward bending of the roll tube 13. Bends, or deviations from a straight line, respectively, of approximately 20 mm have proven advantageous. If the roll tube 13 in the bent state is now rotated by means of the pulley discs 19, said bend will always be downward. The tension element 40, including the tensioning device 34 and the right cap 39, herein are immovable; only the roll tube 13 having the bearing ends 17a and 17b, including the respective bearings, rotates. On account of the force, or the tension, respectively, being applied to the roll tube 13 by way of the tension element 40 that runs within said roll tube 13, the tension element does not interfere and does not require any additional space. Moreover, no high force for bending the spreader roll is required on the bearing blocks 21a and 21b. In this instance, above all on account of the axial bearings 32a and 32b, it is possible for the tension element 40 be disposed so as to be static and for the roll tube 13 to be rotated. The downward bending in each rotation herein is maintained such that bending results once so as to be encircling in each direction of the roll tube in each rotation of the roll tube 13, so to speak. The material, in particular the fiber material or the fiber-composite material, respectively, of the roll tube 13 has to be conceived to this end.

However, in the case of this embodiment it is not necessary for torques to be applied to the roll device 11, or to the roll tube 13, respectively, by way of the bearing blocks 21 or the bearing ends 17, said torques potentially leading to bending of the roll tube 13. This bending is quasi taken care of by the tensioning per se. Such torques are kept away from the bearing blocks 21a and 21b specifically on account of the aforementioned convex bearing faces 23a and 23b, and by the spherical part-shells 26a and 26b having the rotary bearings therein. Furthermore, the erection of such a roll device 11 can thus also be heavily simplified since the bearing blocks 21a and 21b do not have to absorb the forces required for bending the roll tube 13.

In the simplified illustration of FIG. 2, having a downward sagging roll tube 13, it is evident that the tension element 40 of course continues to run in a straight line, however in the bending of the roll tube 13 under certain circumstances can come dangerously close to the internal sides of the bearing ends, or that bending is very obviously limited, respectively. The bearing blocks 21a and 21b herein remain in the original position thereof, or so as to be perpendicular, only the rotary bearings in the spherical part-shells 26a and 26b within the convex bearing faces 23a and 23b having in each case rotated about an axis that is perpendicular to the drawing plane.

In the minor modification of a tensioning device 134 in FIG. 3, the bearing block 21a including the convex bearing face 23a is configured as in FIG. 1. This also applies to the spherical part-shell 26a and to the rotary bearing 29a in which a bearing end 117a is mounted. Said bearing end 117a on the left, next to the rotary bearing 29a, is configured so as to be shorter than in FIG. 1, and an axial bearing 132a is pressed onto a shoulder 120, said axial bearing 132a here not being configured as a ball bearing but as a needle bearing.

To the left thereof, a tensioning device 134 which in principle is configured so as to be similar to that of FIG. 1 is again provided. A piston 136 runs in a cylinder 135 which here is configured so as to be not rotationally symmetrical to the longitudinal central axis Z of the tension element 40. A hydraulic connector 137 is provided for moving said piston 136 to the left. The head 42a of the tension element eyelet 41a again bears on the piston 136 on the left, said tension element eyelet 41a being screw-fitted in the tension element 40.

An alternative design embodiment of a bearing block 221 is illustrated in FIGS. 4 and 5. Said alternative design embodiment serves for rotating the bow plane about an axis which corresponds approximately to the longitudinal central axis L of the roll tube 13, said bow plane according to FIGS. 1 and 2 in the drawing plane pointing downward toward the base 9. A bow deflection for the spreader roll can thus be reduced, so to speak, or very generally set.

The bearing block 221 is again configured in two parts and has a convex bearing face 223 in which a spherical part-shell 226 sits in an exact fit. Rotary bearings, or a rotary bearing receptacle, respectively, (neither illustrated here) can again be disposed in said spherical part-shell 226. A gear rim 247 is attached, or fastened, externally to the spherical part-shell 226. As is shown in FIG. 5, said gear rim 247 encircles the spherical part-shell 226 at least in part or even completely in certain circumstances. An adjustment spindle 244 having a worm 245 is disposed in the bearing block 221 above said gear rim 247. As can be easily imagined, the worm 245 can be rotated by rotating the adjustment spindle 244, and on account of the worm 245 meshing with the gear rim 247, the latter and thus also the spherical part-shell 226, including the rotary bearings disposed therein, are rotated. If this is performed in the same direction and in a uniform manner at both bearing blocks of the roll device from FIG. 1, the bow plane can be readily rotated out of position, or adjusted, respectively, in the manner mentioned. To this end, a mechanical coupling between the adjustment spindles on both bearing blocks can also be provided.

The invention claimed is:

1. A roll device having a rotating hollow roll tube with two ends, wherein said roll tube at said ends is rotatably mounted by means of bearing ends and rotary bearings, wherein said bearing ends are mounted in rotary bearings, wherein said roll device has a tension/compression element, said tension/compression element running through said roll tube, said roll tube toward said ends being impinged by a force, wherein said roll tube is capable of being bent by way of an impingement of said tension/compression element with a force to make a deflection, said deflection of said roll tube being transversely away from a longitudinal extent of said roll tube, wherein said roll tube does not include a support within said roll tube that engages or bears on said roll tube, and wherein said rotary bearings include a torque-free bearing.

2. The roll device as claimed in claim 1, wherein bearing blocks are provided at end regions of said roll device, said rotary bearings being mounted in said bearing blocks.

3. The roll device as claimed in claim 2, wherein said rotary bearings are mounted in said bearing blocks so as to be pivotable about a pivot axis being perpendicular to a central longitudinal axis of said roll tube and/or of said tension/compression element.

4. The roll device as claimed in claim 3, wherein a rotary bearing receptacle of said rotary bearings is disposed in a bearing block so as to be rotatable about an axis in order for a bow plane of said bent roll tube be rotated, wherein said axis runs parallel with said roll tube.

5. The roll device as claimed in claim 4, wherein a gearbox is provided so as to rotate said rotary bearing receptacle on said bearing block out of position.

6. The roll device as claimed in claim 5, wherein said gearbox has one worm gear on each said bearing block.

7. The roll device as claimed in claim 1, wherein said tension/compression element runs so as to be eccentric to a central longitudinal axis of said roll tube.

8. The roll device as claimed in claim 7, wherein said tension/compression element runs so as to be eccentric to a central longitudinal axis of said roll tube having an offset between 1% and 40% of a diameter of said roll tube.

9. The roll device as claimed in claim 8, wherein said tension/compression element runs so as to be above said central longitudinal axis of said roll tube.

10. The roll device as claimed in claim 1, wherein one of said rotary bearings is provided in each of said bearing ends.

11. The roll device as claimed in claim 10, wherein said rotary bearing at a first bearing end is provided at a spacing of 50% to 200% of a diameter of said roll tube from said rotary bearing at a second bearing end.

12. The roll device as claimed claim 1, wherein axial bearings being capable of being impinged with a pressure are provided at said bearing ends, wherein said tension/compression element presses against said axial bearings, or is impinged with a force in relation to said axial bearings, respectively.

13. The roll device as claimed in claim 12, wherein said axial bearings being capable of being impinged with a pressure are provided at said bearing ends close to said free ends of said bearing ends.

14. The roll device as claimed in claim 1, wherein said tension/compression element as a tension element is stressed for tension.

15. The roll device as claimed in claim 14, wherein an active impingement with a force is provided only at one end of said tension/compression element, and said tension/compression element at another end of said tension/compression element is axially supported in relation to said roll tube or in relation to said bearing end.

16. The roll device as claimed in claim 1, wherein said tension/compression element is a tension bar having connection means at said ends.

17. The roll device as claimed in claim 16, wherein said connection means press against axial bearings being capable of being impinged with a pressure, said axial bearings being provided at said bearing ends.

18. The roll device as claimed in claim 1, wherein two of said rotary bearings are provided at each of said bearing ends.

19. The roll device as claimed in claim 18, wherein said rotary bearings at a first bearing end are provided at a spacing of 50% to 200% of a diameter of said roll tube from said rotary bearings at a second bearing end.

20. The roll device as claimed in claim 1, wherein said roll device is a spreader roll in a paper machine.

21. The roll device as claimed in claim 1, wherein said roll tube or said bearing ends are mounted in said rotary bearings without any torque about an axis being perpendicular to said longitudinal extent of said roll device.

22. The roll device as claimed in claim 1, wherein said tension/compression element by means of axial bearings is supported in relation to said roll tube or in relation to said bearing ends.

23. The roll device as claimed in claim 1, wherein said tension/compression element is disposed so as to be static in a non-rotating manner on said roll device.

24. The roll device as claimed in claim 1, wherein said tension/compression element is provided so as to rotate on said roll device conjointly with said roll tube, and for this is fixedly connected to said roll tube or to said bearing ends.

25. The roll device as claimed in claim 1, wherein said roll tube is non-metallic, or is composed of a fiber material or a fiber-composite material.

* * * * *